United States Patent
Gabriel Rosauro Clarke et al.

(10) Patent No.: US 11,946,907 B2
(45) Date of Patent: Apr. 2, 2024

(54) METHOD AND SYSTEM FOR INSPECTION OF JOINTS IN COMPOSITE PIPES AND OF COMPOSITE REPAIRS IN METALLIC PIPELINES

(71) Applicants: PETRÓLEO BRASILEIRO S.A.—PETROBRAS, Rio de Janeiro (BR); UNIVERSIDADE FEDERAL DO RIO GRANDE DO SUL—UFRGS, Porto Alegre (BR)

(72) Inventors: Thomas Gabriel Rosauro Clarke, Porto Alegre (BR); Sergio Damasceno Soares, Petrópolis (BR); Ricardo Callegari Jacques, Porto Alegre (BR); Lúcio De Abreu Corrêa, Canela (BR); Henrique Tormen Haan De Oliveira, Porto Alegre (BR); Giovanno Ferrari Zuglian, Porto Alegre (BR); Alberto Bisognin, Porto Alegre (BR)

(73) Assignees: PETRÓLEO BRASILEIRO S.A.—PETROBRAS, Rio de Janeiro (BR); UNIVERSIDADE FEDERAL DO RIO GRANDE DO SUL—UFRGS, Porto Alegre (BR)

( * ) Notice: Subject to any disclaimer, the term of this patent is extended or adjusted under 35 U.S.C. 154(b) by 462 days.

(21) Appl. No.: 17/253,791

(22) PCT Filed: Jun. 5, 2019

(86) PCT No.: PCT/BR2019/050206
§ 371 (c)(1),
(2) Date: May 24, 2021

(87) PCT Pub. No.: WO2019/241862
PCT Pub. Date: Dec. 26, 2019

(65) Prior Publication Data
US 2023/0184720 A1 Jun. 15, 2023

(30) Foreign Application Priority Data
Jun. 18, 2018 (BR) .......................... 102018012394-7

(51) Int. Cl.
*G01N 29/06* (2006.01)
*G01N 29/24* (2006.01)
(Continued)

(52) U.S. Cl.
CPC ..... *G01N 29/0645* (2013.01); *G01N 29/2462* (2013.01); *G01N 29/348* (2013.01);
(Continued)

(58) Field of Classification Search
CPC ........... G01N 29/0645; G01N 29/2462; G01N 29/348; G01N 29/4418; G01N 2291/104; G01N 2291/2634
See application file for complete search history.

(56) References Cited

U.S. PATENT DOCUMENTS

| 7,424,910 B2 | 9/2008 | Xu et al. |
| 2008/0294354 A1 | 11/2008 | Zhu et al. |

(Continued)

FOREIGN PATENT DOCUMENTS

| EP | 1 523 393 B1 | 5/2006 |
| RU | 2 278 378 C1 | 6/2006 |

(Continued)

OTHER PUBLICATIONS

International Search Report for PCT/BR2019/050206 dated Aug. 20, 2019.

*Primary Examiner* — Xin Y Zhong
(74) *Attorney, Agent, or Firm* — ARENTFOX SCHIFF LLP

(57) ABSTRACT

The present disclosure is related to techniques for the inspection of joints and repairs in pipelines. In this scenario, the a method is provided for the inspection of joints in composite pipes and of composite repairs in metallic pipelines, comprising the steps of (i) emitting a series of acoustic wave pulses, at different frequencies, from a collar of acoustic transducers positioned at a predetermined distance from a joint or repair to be inspected, (ii) recording, in a time interval subsequent to the emission, echoes of wave displacements to the repair or joint in each of the transducers in the form of an A-Scan, and (iii) generating a flattened C-Scan image, through a CSM, for each frequency of pulse emission from the collar of acoustic transducers. The dis- (Continued)

closure further provides a system for inspection of joints in composite pipes and of composite repairs in metallic pipelines associated with the provided method.

4 Claims, 3 Drawing Sheets

(51) Int. Cl.
    *G01N 29/34*     (2006.01)
    *G01N 29/44*     (2006.01)

(52) U.S. Cl.
    CPC ... *G01N 29/4418* (2013.01); *G01N 2291/104* (2013.01); *G01N 2291/2634* (2013.01)

(56) References Cited

U.S. PATENT DOCUMENTS

| | | | | |
|---|---|---|---|---|
| 2015/0308981 | A1* | 10/2015 | Fisher | G01N 29/265 73/168 |
| 2016/0290965 | A1* | 10/2016 | Owens | G01N 27/82 |
| 2018/0011064 | A1* | 1/2018 | Furr | G01N 29/4463 |

FOREIGN PATENT DOCUMENTS

| | | |
|---|---|---|
| RU | 2 380 699 C1 | 1/2010 |
| WO | 2013/044350 A1 | 4/2013 |
| WO | 2016/062897 A1 | 4/2016 |

\* cited by examiner

METHOD AND SYSTEM FOR INSPECTION OF JOINTS IN COMPOSITE PIPES AND OF COMPOSITE REPAIRS IN METALLIC PIPELINES

CROSS-REFERENCE TO RELATED APPLICATIONS

This application is a United States National Stage Application of co-pending International Patent Application Number PCT/BR2019/050206 filed 5 Jun. 2019, which claims the benefit of priority to BR 102018012394-7, filed 18 Jun. 2018, the contents of which is are incorporated herein by reference in their entireties.

TECHNICAL FIELD

The present disclosure is related to pipeline inspection techniques. More specifically, the present disclosure is related to techniques for inspection of joints and repairs in pipelines.

BACKGROUND

Composite materials are being increasingly used in various industrial sectors. The aerospace sector is the largest user of this type of material. However, industries of the petroleum, gas, and energy sectors are following this trend, primarily because of the high strength/weight ratio, immunity to corrosion, and possibility for "cold" application of these materials. In the petroleum and gas industry, the possibility for cold application of joints and repairs is very attractive because it eliminates the need to isolate the environment and leave it free of combustion and explosion risks.

Two classes of applications for composite materials are being established in the petroleum, gas, and energy industry: repairs with composite materials and structural materials produced entirely of composite materials. The first involves the application of a layer of composite material over a metallic structural element, serving as a barrier to corrosion or as a structural reinforcement. The second class primarily involves pipes and pressure vessels consisting entirely of composite materials.

In the petroleum, gas, and energy industry, the history of failures with composite materials is predominantly related to assembly defects or problems during the application of coatings in the field. This is the typical case of repairs and protective coatings of composites and of connections between pipes of composite materials.

In both cases, the conditions of application are normally not favorable, resulting in a higher probability of incidence of defects such as: adhesion failures (at the metal-composite and composite-composite interfaces); delaminations (adhesion failures between layers of the composite); inclusions (presence of bubbles and foreign bodies between layers of the composite); and non-homogeneity in the distribution of fibers in the composite. There can also be structural defects stemming from the manufacturing process of the components.

Defects in protective coatings and repairs can compromise the efficacy of the protection or structural reinforcement. If not detected and corrected, defects in joints and connections of composite pipe structures can evolve and lead to operational failures, entailing the risk of product leakage.

The use of composite repairs in metallic pipelines has increased in the field, however, the lack of an inspection tool makes its use highly restricted. Thus, in the current state of use of these materials, it is imperative to inspect the coatings and repairs applied in the field as well as connections and joints in composite structures.

The current prior art describes varied techniques for pipeline inspection, as can be observed in the examples below.

The document EP1523393B1 discloses a method for the inspection of welds in pipelines via the arrangement of a series of electromagnetic acoustic transducers (EMAT) arranged circumferentially in relation to the internal or external wall of the welded end of the pipeline. By inducing the EMAT arrangement to sequentially or simultaneously transmit acoustic shear wave signals in different modes and angles towards the weld, it is possible to detect shear waves.

However, the technique of document EP1523393B1 does not apply to joints in composite/polymeric pipelines, nor to polymeric/composite repairs in metallic pipelines.

The documents RU2380699C1, RU2278378C1, and U.S. Pat. No. 7,424,910B2 disclose methods for detecting defects between polymeric coatings and metallic pipelines. However, these techniques do not apply to joints of pipelines of composite or polymeric materials, for example.

Thus, there is a need in the prior art for an efficient method that encompasses the inspection of joints in composite/polymeric pipelines and polymeric/composite repairs in metallic pipelines, both of which are currently widely used in the petroleum and gas industry.

SUMMARY

As will be explained in greater detail below, the present disclosure aims to solve the aforementioned problem in the prior art in a practical and efficient way.

The present disclosure has the main goal of providing a method and system of non-destructive inspection that can be applied to joints in composite pipes and in composite repairs in metallic pipelines.

In order to achieve the objective described above, the present disclosure provides a method for inspection of joints in composite pipes and composite repairs in metallic pipelines comprising the steps of (i) emitting a series of acoustic wave pulses, at different frequencies, from a collar of acoustic transducers positioned at a predetermined distance from the joint or repair to be inspected, (ii) recording, in a time interval subsequent to the emission, the echoes of the wave displacements to the repair or joint in each of the transducers of the collar of acoustic transducers in the form of A-Scan, and (iii) generating a flattened C-Scan image, through the CSM method, for each frequency of pulse emission from the collar of acoustic transducers.

The present disclosure also provides a system for inspection of joints in composite pipes and of composite repairs comprising (i) a collar of acoustic transducers positioned at a predetermined distance from the joint or repair to be inspected, adapted to emit a series of acoustic wave pulses at different frequencies, (ii) means of registering, in a time interval subsequent to the emission, the wave displacements in each of the transducers of the collar of acoustic transducers in the form of A-scan, and (iii) means of generating a flattened C-Scan image, through the CSM method, for each frequency of pulse emission from the collar of acoustic transducers.

BRIEF DESCRIPTION OF FIGURES

The detailed description presented below makes reference to the attached figures and their respective reference numbers.

DETAILED DESCRIPTION

Preliminarily, it is emphasized that the description that follows will start from a preferred embodiment of the invention. As will be evident to any person skilled in the art, however, the invention is not limited to this particular embodiment.

Figure 1:
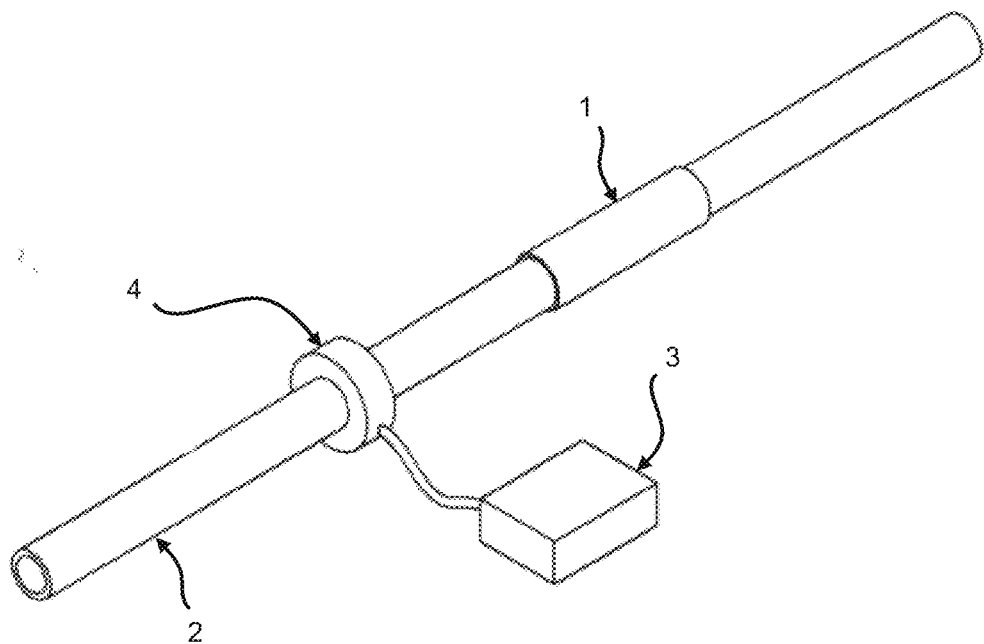
FIG. 1 illustrates a schematic view of the system of the present disclosure applied to a polymeric or composite repair in a metallic pipeline.
Figure 2:
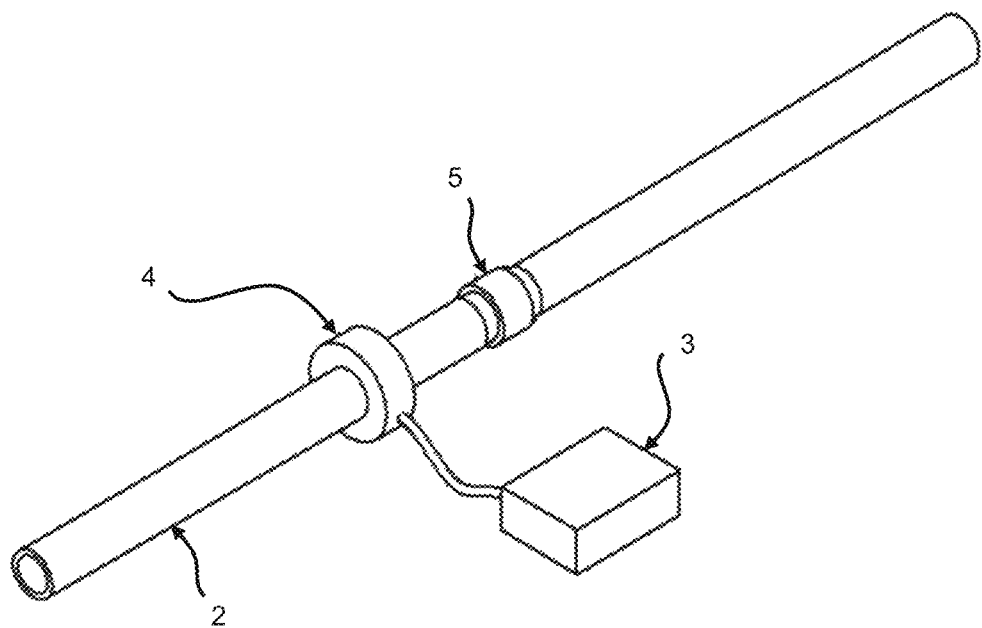
FIG. 2 illustrates a schematic view of the system of the present disclosure applied to a joint in a polymeric or composite pipeline.

FIG. 1 illustrates a schematic view of the system of the present disclosure applied to a polymeric or composite repair 1 in a metallic pipeline 2. FIG. 2, in turn, illustrates a schematic view of the system of the present disclosure applied to a threaded or taped joint 5 in a polymeric or composite pipeline 6.

The system for inspection of joints in composite pipes and of composite repairs in metallic pipelines, in accordance with a preferred embodiment of the present disclosure, will comprise a collar of acoustic transducers 4 positioned at a predetermined distance from the joint 5 or repair 1 to be inspected. Preferably, the transducers used in the collar of acoustic transducers 4 are piezoelectric transducers.

Preferably, the predetermined distance is of up to 10 meters. More preferably, the predetermined distance is from 1 to 5 meters.

Figure 3:
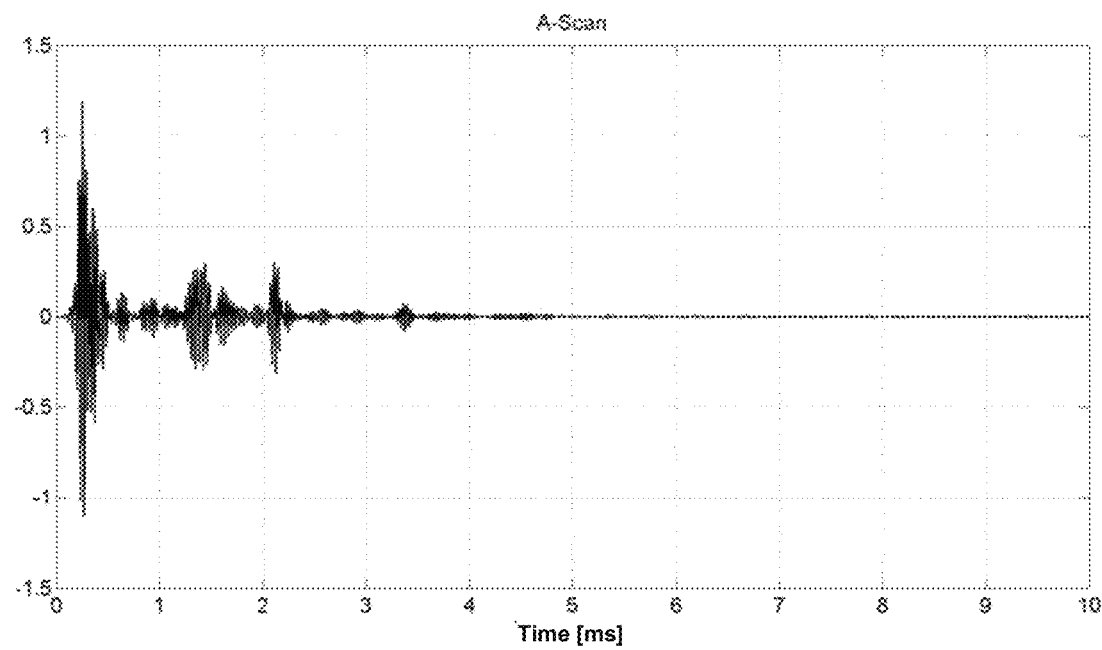
FIG. 3 illustrates a graph of intensity versus time resulting from collection of the echoes of the mechanical waves by means of the system of the present disclosure, known as A-Scan.

The collar of acoustic transducers 4 is adapted to emit a series of acoustic wave pulses at different frequencies. The pulses are preferably emitted in a controlled way, followed by time intervals in which recordings are made of the echoes of the wave displacements to the repair or joint in each of the transducers. Thus, the recordings are taken in a time interval subsequent to the emission, being stored in the form of A-Scan (FIG. 3).

Preferably, the series of pulse emissions should be realized with different emission frequencies to attain a specific band of frequencies. Preferably, the frequency band attained ranges from 10 kHz to 70 kHz.

The measurements of all the transducer elements of the collar are collected and stored in the form of A-Scans for the application of the methods of localization and evaluation of the defect.

Figure 4:
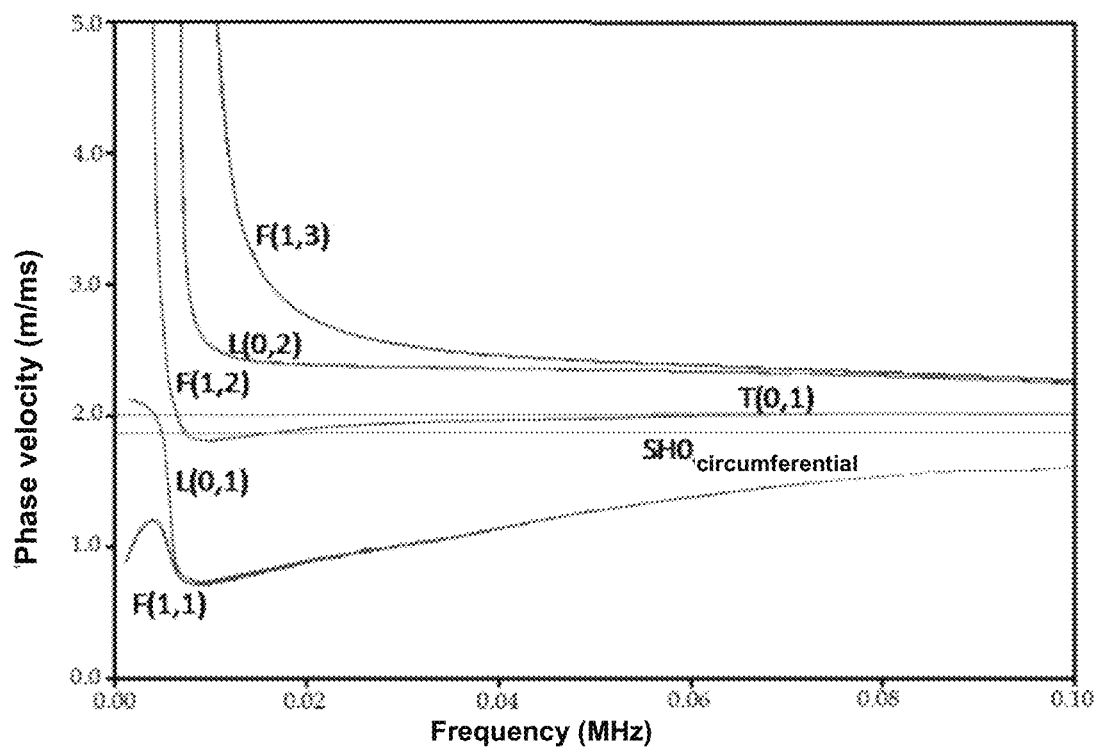
FIG. 4 illustrates a graph of phase velocity versus frequency showing the dispersion curves for a polymeric pipe joint reinforced with fiberglass.

The data in the form of A-Scan are then processed in order to back-propagate the captured waves back to the positions from which they originated using prior knowledge of the dispersion curves of the waveguide used. FIG. 4, for example, illustrates a graph of phase velocity versus frequency showing the dispersion curves for a polymeric pipe joint reinforced with fiberglass.

Figure 5:
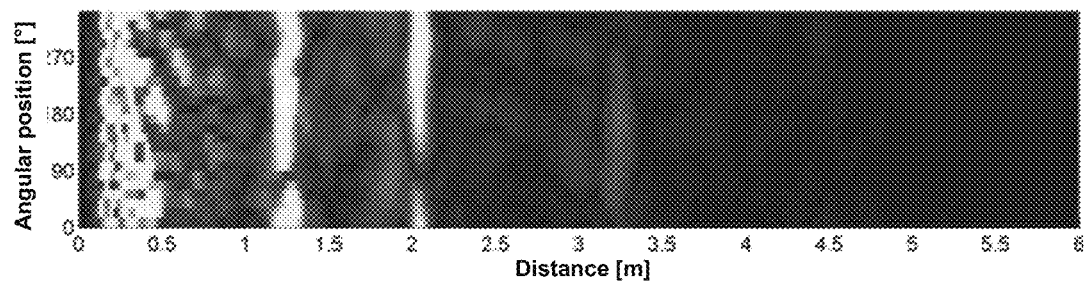
FIG. 5 illustrates a C-Scan type result of angular position versus distance.

Preferably, the method utilized for processing the A-Scan data is the Common Source Method (CSM), widely disseminated in the prior art for the treatment of data in non-destructive tests. The application of the CSM results in a C-Scan, which is a flattened image of the sound sources of the pipeline. FIG. 5 illustrates an example of a C-Scan, consisting of the axes of angular position versus distance.

Preferably, a flattened C-Scan image is generated for each frequency of pulse emission from the collar of acoustic transducers 4.

The analysis of the C-Scan images generated permits the identification of points of interest in the area inspected. After the localization of a possible defect using the C-Scan image, the longitudinal and circumferential positions of the defect on the surface of the pipeline are used to cut part of the A-Scan data, in which two methods of evaluating the size of the defect are applied.

Figure 6:
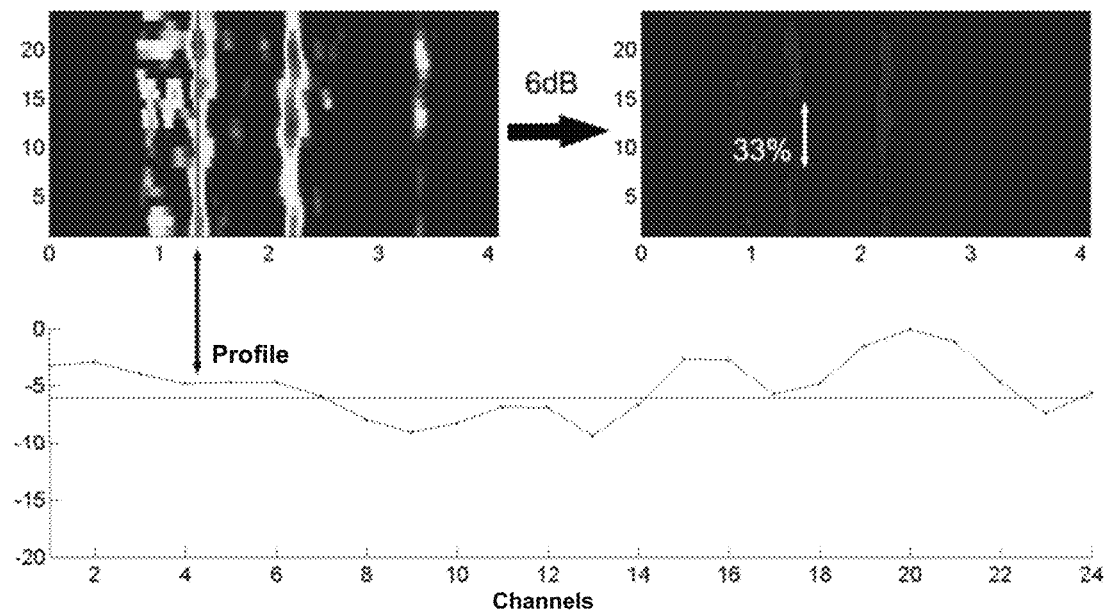
FIG. 6 illustrates the steps of evaluation of the circumferential extent of a defect in accordance with the method of the present disclosure.

For the evaluation of the circumferential extent of a possible defect, a comparison threshold is used and the number of channels reaching this threshold is counted, and then the percentage value of the circumferential extent of the defect is counted, as shown in FIG. 6.

For the evaluation of the longitudinal extent of the defect, it is necessary to use all of the A-Scans in the different pulse frequencies, added and transformed to the frequency domain where the distance between local minima of that curve corresponds inversely to the longitudinal extent between reflections, and therefore of the defect. The width of the frequency range utilized in the emission is linked to the minimum longitudinal size of the defect that will be able to be observed by the method.

The present disclosure further provides a system for inspection of joints in composite pipes and of composite repairs in metallic pipelines associated with the method described above. The system will comprise:

(i) a collar of acoustic transducers 4 positioned at a predetermined distance from the joint 5 or repair 1 to be inspected, adapted to emit a series of acoustic wave pulses at different frequencies;

(ii) means of registering, in a time interval subsequent to the emission, the wave displacements in each of the transducers of the collar of acoustic transducers 4 in the form of A-Scan;

(iii) means of generating a flattened C-Scan image, through the CSM method, for each frequency of pulse emission from the collar of acoustic transducers 4.

Thus, the present disclosure provides a fairly simple and practical method and system of non-destructive testing, which can be applied to joints in composite pipes as well as in composite repairs in metallic pipelines.

Countless variations covered in the scope of protection of the present application are allowed. Thus, it is emphasized that the present disclosure is not limited to the specific configurations/embodiments described above.

The following examples are illustrative only and may be combined with aspects of other embodiments or teachings described herein, without limitation.

Example 1 is a method for the inspection of joints in composite tubes and of composite repairs in metallic pipelines, comprising the steps of: emitting a series of acoustic wave pulses, at different frequencies, from a collar of acoustic transducers positioned at a predetermined distance from a joint or a repair to be inspected; recording, in a time interval subsequent to the emission, echoes of wave displacements to the repair or the joint in each of the transducers of the collar of acoustic transducers in the form of an A-Scan; and generating a flattened C-Scan image, through a common source method (CSM), for each frequency of pulse emission from the collar of acoustic transducers.

Example 2 is the method of Example 1, the step of generating the flattened C-Scan image comprising processing A-Scan data via back-propagation of captured acoustic waves back to positions from which the captured acoustic waves originated using prior knowledge of dispersion curves of a waveguide used.

Example 3 is the method of Examples 1 or 2, further comprising the step of circumferentially evaluating a particular defect revealed by the flattened C-Scan image using a predetermined threshold of comparison, in which: a number of channels reaching the threshold are counted; and a percentage value of a circumferential extent of the defect is counted based on a quantity of channels that reach the threshold.

Example 4 is the method of any of Examples 1 to 3, further comprising the step of longitudinally evaluating a particular defect, in which: all of the A-Scans in the different pulse frequencies are added to obtain a sum; the obtained sum is transformed to a frequency domain where a distance between local minima of a curve corresponds inversely to a longitudinal extension between reflections; and a minimum longitudinal size of the defect is calculated based on a width of a frequency range used in the emission.

Example 5 is a system for inspection of joints in composite tubes and of composite repairs in metallic pipelines, comprising: a collar of acoustic transducers positioned at a predetermined distance from a joint or a repair to be inspected, and adapted to emit a series of acoustic wave pulses at different frequencies; means of recording, in a time interval subsequent to the emission, wave displacements in each of the transducers of the collar of acoustic transducers in the form of an A-Scan; and means of generating a flattened C-Scan image, through a common source method (CSM), for each frequency of pulse emission from the collar of acoustic transducers.

The invention claimed is:

1. A method for inspection of joints in composite tubes and of composite repairs in metallic pipelines, comprising:
   emitting a series of acoustic wave pulses, at different frequencies, from a collar of acoustic transducers positioned at a predetermined distance from a joint or a repair to be inspected;
   recording, during a time interval subsequent to the emission, echoes of wave displacements to the repair or the joint in each of the transducers of the collar of acoustic transducers in the form of an A-Scan;
   generating a flattened C-Scan image, through a common source method (CSM), for each frequency of pulse emission from the collar of acoustic transducers; and
   circumferentially evaluating a particular defect revealed by the flattened C-Scan image using a predetermined threshold of comparison, in which:
      a number of channels reaching the threshold are counted; and
      a percentage value of a circumferential extent of the defect is counted based on a quantity of channels that reach the threshold.

2. The method, in accordance with claim 1, wherein generating the flattened C-Scan image comprises processing A-Scan data via back-propagation of captured acoustic waves back to positions from which the captured acoustic waves originated using prior knowledge of dispersion curves of a waveguide used.

3. The method, in accordance with claim 1, further comprising longitudinally evaluating the particular defect, in which:
   all of the A-Scans in the different pulse frequencies are added to obtain a sum;
   the obtained sum is transformed to a frequency domain where a distance between local minima of a curve corresponds inversely to a longitudinal extension between reflections; and
   a minimum longitudinal size of the defect is calculated based on a width of a frequency range used in the emission.

4. A system for inspection of joints in composite tubes and of composite repairs in metallic pipelines, comprising:
   a collar of acoustic transducers positioned at a predetermined distance from a joint or a repair to be inspected, and adapted to emit a series of acoustic wave pulses at different frequencies;
   means of recording, during a time interval subsequent to the emission, wave displacements in each of the transducers of the collar of acoustic transducers in the form of an A-Scan; and
   means of generating a flattened C-Scan image, through a common source method (CSM), for each frequency of pulse emission from the collar of acoustic transducers, and of circumferentially evaluating a particular defect revealed by the flattened C-Scan image using a predetermined threshold of comparison, in which:
      a number of channels reaching the threshold are counted; and
      a percentage value of a circumferential extent of the defect is counted based on a quantity of channels that reach the threshold.

* * * * *